(12) United States Patent
Tetzel

(10) Patent No.: US 11,079,659 B2
(45) Date of Patent: Aug. 3, 2021

(54) SLIDING COVER WITH INCLINED-PLANE SEAL FOR WEATHER SEALED CONSUMER ELECTRONICS DEVICE

(71) Applicant: Netgear, Inc., San Jose, CA (US)

(72) Inventor: Andrew Tetzel, Vancouver (CA)

(73) Assignee: Arlo Technologies, Inc., Carlsbad, CA (US)

( * ) Notice: Subject to any disclaimer, the term of this patent is extended or adjusted under 35 U.S.C. 154(b) by 254 days.

(21) Appl. No.: 15/981,171

(22) Filed: May 16, 2018

(65) Prior Publication Data

US 2019/0353984 A1    Nov. 21, 2019

(51) Int. Cl.
*G03B 17/08* (2021.01)
*G03B 17/56* (2021.01)
*H01M 50/20* (2021.01)
*H01M 50/24* (2021.01)

(52) U.S. Cl.
CPC ............ *G03B 17/08* (2013.01); *G03B 17/56* (2013.01); *H01M 50/20* (2021.01); *H01M 50/24* (2021.01); *H01M 2220/30* (2013.01)

(58) Field of Classification Search
CPC ....... G03B 17/56; G03B 17/08; H01M 50/20; H01M 50/24
USPC ....................................................... 396/539
See application file for complete search history.

(56) References Cited

U.S. PATENT DOCUMENTS

| | | | | |
|---|---|---|---|---|
| 2007/0147004 A1* | 6/2007 | Caines | ................... | H05K 5/061 361/707 |
| 2014/0104488 A1* | 4/2014 | Samuels | .............. | H04N 5/2252 348/374 |
| 2014/0226062 A1* | 8/2014 | Parrill | .................... | G03B 17/08 348/376 |
| 2018/0252988 A1* | 9/2018 | Ejiri | ...................... | G06F 1/1643 |
| 2018/0283601 A1* | 10/2018 | Wei | ....................... | F16M 11/041 |
| 2019/0151897 A1* | 5/2019 | Fujimoto | ............... | G03B 17/56 |
| 2020/0385183 A1* | 12/2020 | Ziering | ................... | A24F 15/20 |

\* cited by examiner

*Primary Examiner* — Christopher E Mahoney
(74) *Attorney, Agent, or Firm* — Boyle Fredrickson S.C.

(57) ABSTRACT

An outdoors consumer electronics device such as a camera contains electrical equipment this is isolated from exterior moisture. The consumer electronics device includes a housing configured to contain the electrical equipment, a seal mounted to the housing, and a cover that is releasably installable onto the housing. The seal includes a top surface that forms an inclined plane related to a bottom plane extending through the bottom edges of the seal. When the cover is installed onto the housing, the seal is compressed along a planar surface. Once the seal is compressed, moisture is prevented from entering the interior of the housing. While the seal that is formed when the cover is mounted to the housing is planar, the sealed area is non-planar.

19 Claims, 8 Drawing Sheets

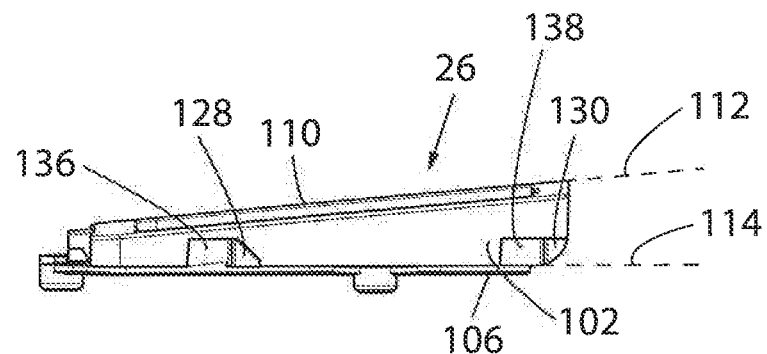
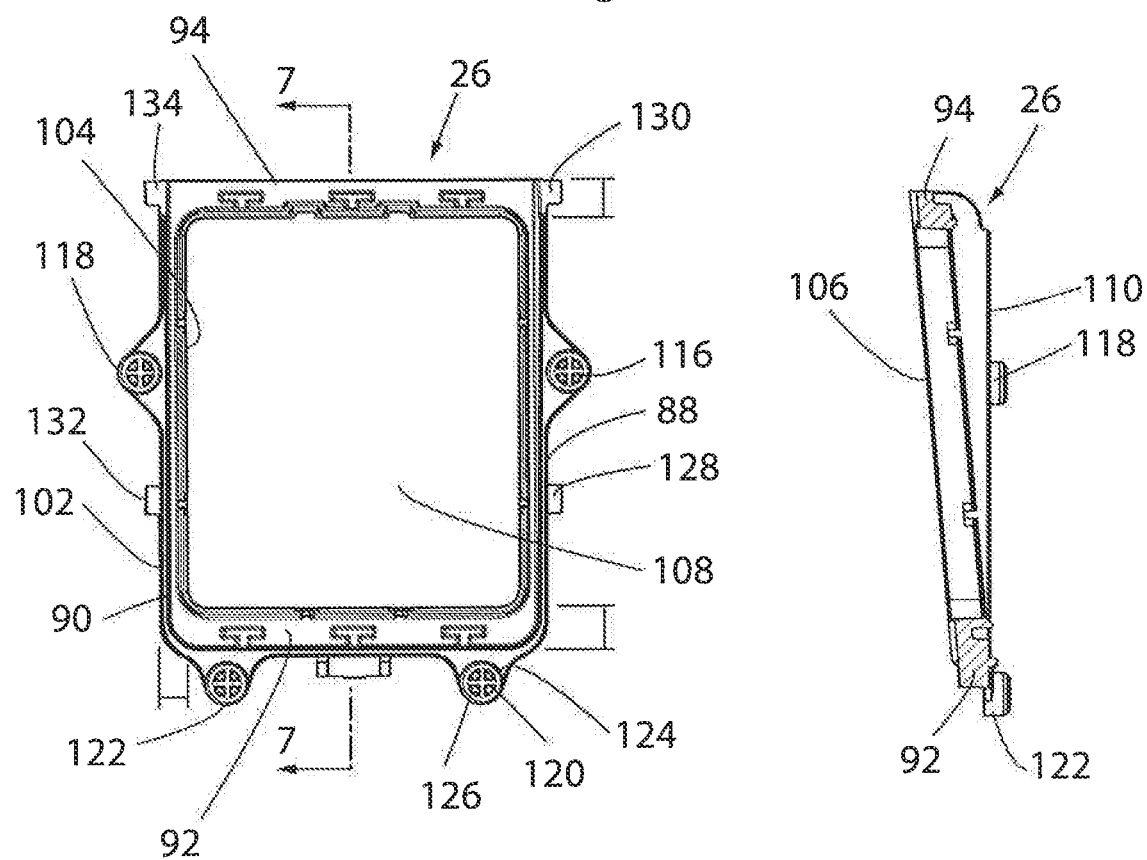
Fig 5
Fig 6
Fig 7

SLIDING COVER WITH INCLINED-PLANE SEAL FOR WEATHER SEALED CONSUMER ELECTRONICS DEVICE

BACKGROUND OF THE INVENTION

1. Field of the Invention

The invention relates generally to a sliding cover for a consumer electronics device, and more particularly, relates to a sliding cover for a consumer electronics device containing electronic equipment such as a battery where the consumer electronics device has a seal with an inclined plane. The invention additionally relates to consumer electronics device with a seal that is compressed along a planar surface to form a non-planar sealing area.

2. Discussion of the Related Art

A common issue with many consumer electronics devices containing electrical components is that the devices can be compromised by the presence of moisture. For instance, portable camera devices, such as surveillance and security cameras, containing batteries can be damaged or rendered useless when water seeps into the interior of the devices. It can be challenging to keep the interior of these devices dry, especially where the device is used outdoors and is subject to adverse weather conditions.

To avoid these types of issues, the interior compartment of such devices containing electrical components such as the battery must be sufficiently isolated from the external environment to prevent moisture ingress from rain, snow, etc. This isolation has been achieved in the past using a variety of different techniques. For instance, many traditional devices include complicated hinge and locking catch designs that catch a door or cover to the body of the device. Of course, the more components that are required to seal the interior of the device, the costlier the device becomes to manufacture and assemble. Additionally, the inclusion of multiple components increases the complexity of assembly and repair.

Other devices feature lids or covers that can be removed from a device housing by sliding the lid or cover out of sealing engagement with the housing to allow for access into the interior of the housing. Many traditional consumer electronics devices with a housing and a cover feature both horizontal and vertical sealing surfaces, as well as tight corners, all of which hinder assembly and make it more difficult to form a seal between the housing and the cover when the cover is removed and replaced. All of these features increase the risk that the seal will be compromised and/or damaged.

Alternative prior designs required a user to fully compress a seal, and then slide the cover laterally, which would require a significant amount of work in order to get the cover installed on the housing.

Further still, conventional sealing planes work against a catch force that occurs between the cover and the housing when the cover is snapped into its closed position. This feature also can compromise the seal because the compressions required to form a seal results in a force that is acting in the opposite direction of the snap force. In fact, the such forces can result in the unsnapping of the cover.

In light of the foregoing, what is needed is a simple consumer electronics device having minimal components that is capable of forming a seal between various components to isolate the internal contents of the consumer electronics device.

What is also needed is a consumer electronics device having a seal that can be compressed when a cover is mounted to a housing in a manner that accommodates a snap-fit of the cover to the housing while providing an effective seal.

SUMMARY OF THE INVENTION

One or more of the above-identified needs are met by providing a consumer electronics device which includes a housing containing electronics, a seal mounted to the housing, and a cover that is releasably movable relative to the housing between an opened and a closed position. The cover may provide selective access to an interior battery compartment of the device.

The cover may have a travel distance between 2 and 4 millimeters from the opened position to the closed position, and more typically a travel distance of approximately 3 millimeters.

The seal may have an inclined lower surface. The seal may also have a top edge that extends along a top horizontal plane, wherein the lower surface is inclined at an acute angle relative to the top horizontal plane. For instance, the angle between the top plane and the lower surface may be between 2-7 degrees and may be approximately 5 degrees. When the cover is moved to the closed position, the cover may compress the seal along a planar surface. Once the seal is compressed, a sealing area is formed between the cover and the housing that is non-planar.

Additionally, the housing may have an opening formed therein with a mounting lip formed around the perimeter of the opening, with the seal being sealable on the lip. Furthermore, the cover may have a rib extending beneath a top surface that extends in substantially the same dimension as the perimeter of the seal and the mounting lip. The rib may compress the seal when the cover is moved to the closed position, which in turn isolates the electrical equipment.

Additionally, the seal may have at least one tab extending therefrom, and the housing may have at least one socket formed therein. A lug on tab may fit within the socket, which ensure that the seal is appropriately mounted to the housing and forms an interference fit.

The cover and housing may also have fasteners, such as hooks and catches, to secure the cover and the housing to one another.

In accordance with another aspect of the invention, a method is providing of selectively sealing a cover against a housing of a consumer electronics device to seal the interior of the housing from the environment. The method includes the steps of locating a compressible seal adjacent to the housing, orienting the cover adjacent to a rear wall of the housing, and sliding the cover at an acute angle relative to the housing and the compressible seal to compress the seal between the housing and the cover along an inclined rear surface of the compressible seal. While this happens, an environmental seal is formed between the cover and the housing. Additionally, the cover may be releasably locked relative to the housing in a closed configuration. This may occur using at least one hook that may be engaged with at least one catch.

The method may also include the alignment of the compressible seal with the housing with lugs and sockets. The method may also include the alignment of the compressible seal and the housing with at least one finger that abuts at least one catch, and at least one groove in which the at least one catch can be inserted. The method may also include the alignment of openings in the seal and the housing, after which electronic equipment can be removably inserted into the housing.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which:

FIG. 5 is a side elevation view of the seal of FIGS. 1 and 4;

FIG. 6 is a front plan view of the seal of FIGS. 1, 4, and 5;

FIG. 7 is a sectional side elevation view of the seal taken about line 7-7 of FIG. 6;

DETAILED DESCRIPTION OF THE PREFERRED EMBODIMENTS

Figure 1:
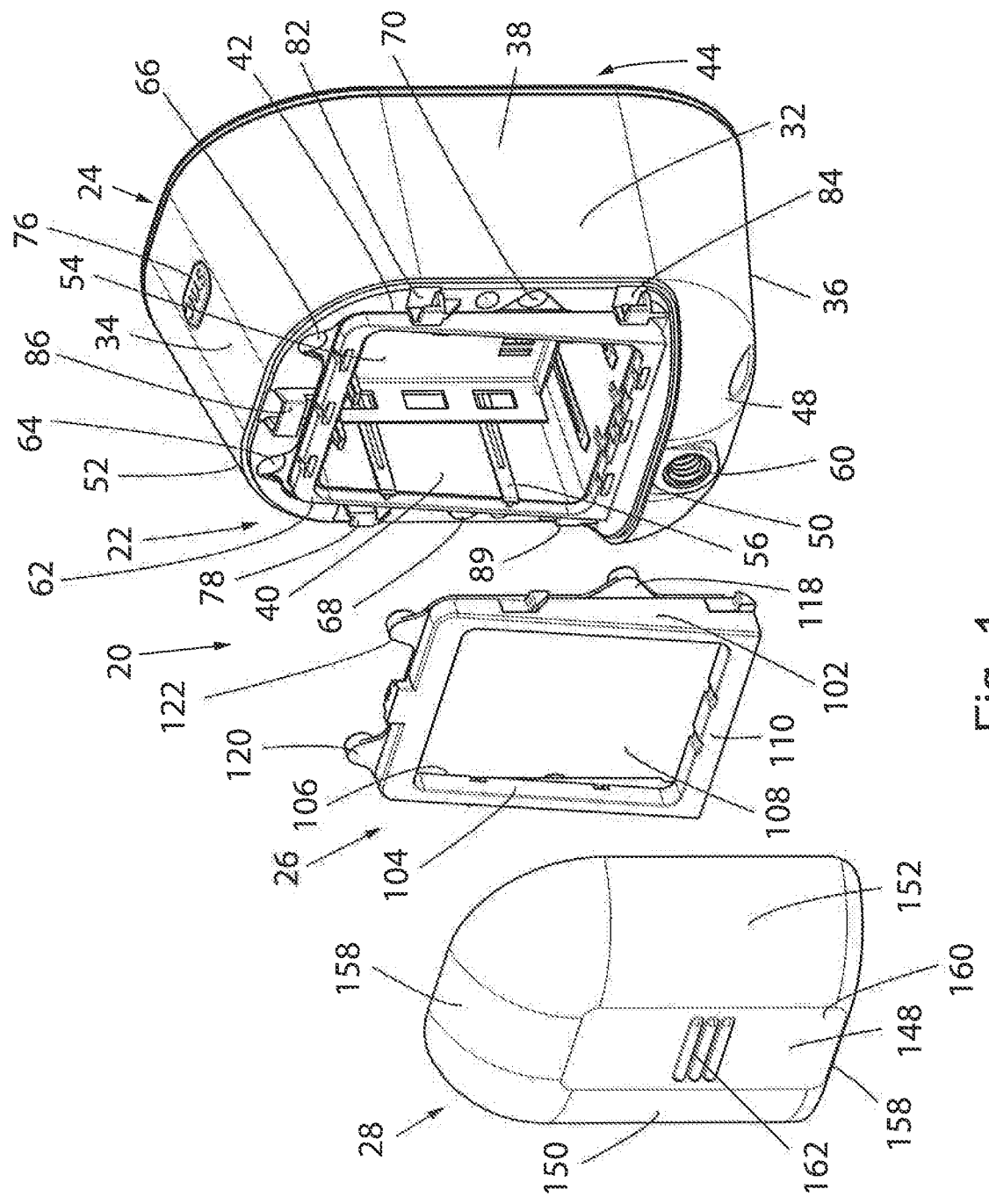
FIG. 1 is an exploded perspective view of a consumer electronics device including a housing, a seal, and a cover.

A wide variety of consumer electronics devices that need to be sealed could be constructed in accordance with the invention as defined by the claims. Hence, while the preferred embodiments of the invention will now be described with reference to an outdoor consumer electronics device with electrical components located therein, it should be understood that the invention is in no way so limited.

Referring generally to the figures, a consumer electronics device 20 in the form of a portable surveillance camera device 22 constructed in accordance with one embodiment of the present invention is shown. The device 20 includes a housing 24, a compressible seal 26, and a removable cover 28. The housing 24 and the removable cover 28 may be made from a plastic material, such as an injection-molded plastic, and the compressible seal 26 may be formed of a resilient material such as rubber or a compression molded silicon. For instance, the compressible seal 26 may be a silicone having a durometer of 30-60 to optimize sliding action, durability, and UV stability while minimizing friction. The compressible seal 26 may be separately manufactured and then installed into the housing 24 using interference fittings described below and/or glued or otherwise retained in place. Alternatively, the compressible seal 26 could be co-molded onto the housing 24. The cover 28 is slidably mounted to the housing 24, which results in the compression of the compressible seal 26 to form an environmental seal between the cover 28 and the housing 24. In one embodiment, the seal can achieve an "ingress protection" rating, as set by IEC standard 60529, of IP65 or better, with the second digit or "5" portion of the rating meaning the seal is certified to assure that water projected by a nozzle (6.3 mm) from a distance of 3 m against the enclosure from any direction shall have no harmful effects. The IEC standard specifies a test duration of 3 minutes and a water volume of 12.5 liters per minute at a pressure of 30 kPa. Lighter seals having a rating of IP54 would be acceptable in some applications. By forming an environmental seal between the cover 28 and the housing 24, moisture can be prevented from entry into the device 20. In doing so, components located within the housing 24 can be protected from moisture, which could damage the components and impair the functionality of the device 20.

Figure 2:
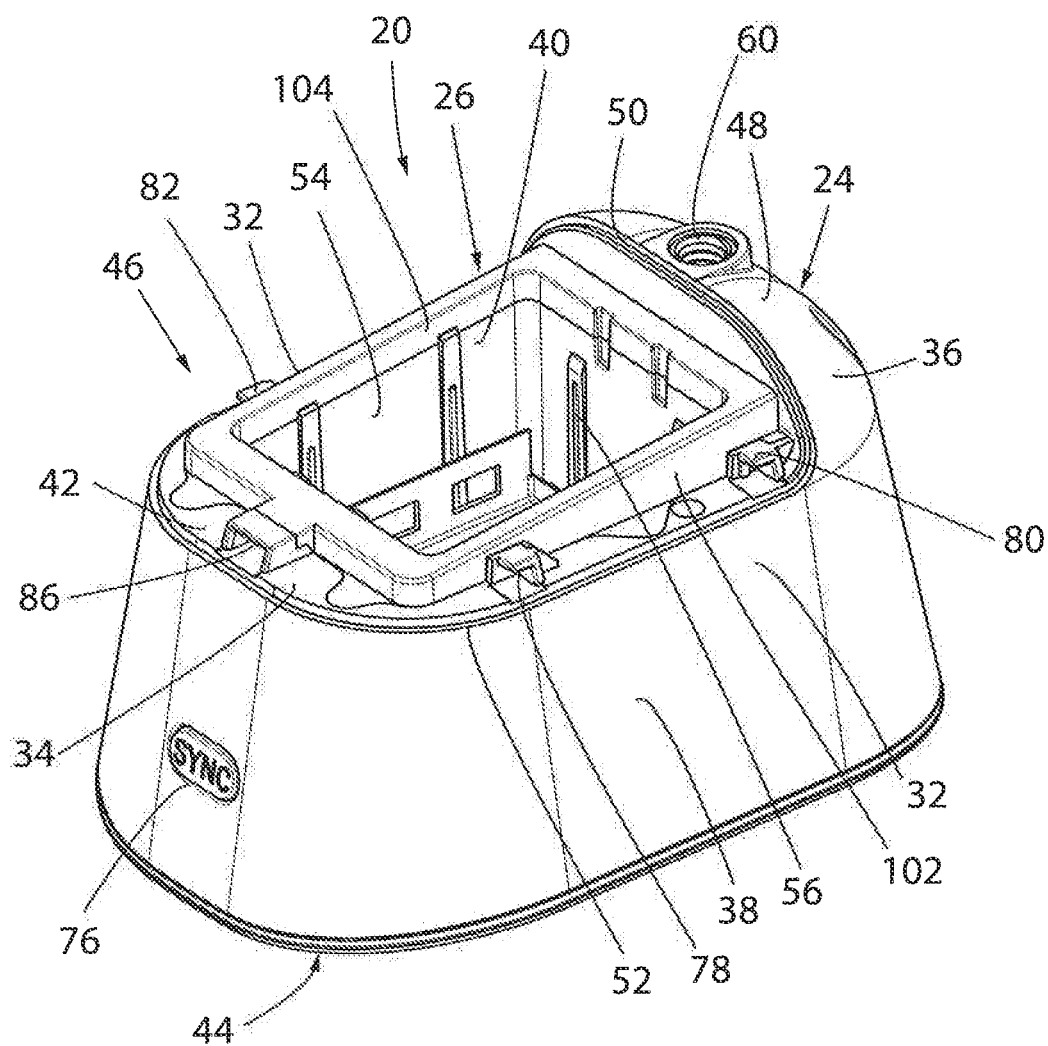
FIG. 2 is a rear perspective view of the seal mounted within the housing of the device of FIG. 1.

The housing 24 will now be described. As seen in FIGS. 1 and 2, the housing 24 has a first left side 30 and a second right side 32 opposite the first side 30, and top and bottom ends 34, 36 opposite one another. Additionally, the housing 24 may have an outer sidewall 38, an inner sidewall 40, a rear wall 42 extending from the outer sidewall 38 to the inner sidewall 40, and a front side 44 extending along the length of the outer sidewall 38. (Term's such as "rear", "front", "left", "right", etc. are provided as a frame of reference as opposed to requiring any particular orientation in use of the camera.") The housing 24 may also have a rear side 46 including a rounded bottom section 48 at the bottom end 36 that terminates in a straight edge 50. A channel 52 may be formed along the rear wall 42 along the outer sidewall 38 and up along the rounded bottom section 48 to facilitate the locating and sliding of the cover 28 relative to the housing 24. The housing 24 also includes an opening 54 formed in the middle of the rear side 46 of the housing 24. Multiple openings and channels 56 may be formed in the inner sidewall 40 to facilitate alignment of components, such as a battery 58, within the opening 54. A threaded receptacle 60 is formed in the rounded bottom section 48 of the housing 24 beneath the opening 54 for receiving a mount (not shown).

The housing 24 may additionally feature a lip 62 that extends around the perimeter of the opening 54 at the rear wall 42, as seen in FIG. 1. The lip 62 may be dimensioned to help facilitate the secure location and seating of the compressible seal 26 about the housing 24, as will further be described below. Additionally, at least one socket may be formed in the rear wall 42. As shown, four sockets are formed in the rear wall 42, with two sockets 64, 66 formed in the top wall directly adjacent to the top end 34, and third and fourth sockets 68, 70 formed in the rear wall 42 directly adjacent to the first side 30 and second side 32, respectively. These sockets 64, 66, 68, 70 are also configured to help properly align the compressible seal 26 with the housing 24, as will further be described below.

As described above, the housing 24 is configured to house various electronic components. More specifically, with brief reference to FIG. 11, the opening 54 may be specifically dimensioned to receive the electrical components, such as a removable battery 58 and associated wiring. Additionally, the housing 24 may house other electrical components, such as components associated with the operation of the camera 22, including a lens 72 and a circuit board (not shown). The illustrated housing 24 also includes a "sync" button 76 that can be compressed that results in the synchronization of the device 20 with another device. Of course, additional electrical components could also be included to optimize use of the device 20.

Also, the housing 24 may have at least one fastener device, which allows the cover 28 to be lockably secured to the housing 24. For instance, the illustrated embodiment includes a plurality of catches located around the opening 54 that extend from the rear wall 42. First and second catches 78, 80 are shown on the first side 30 of the housing 24, and third and fourth catches 82, 84 are shown on the second side 32 of the housing 24. The first and third catches 78, 82 are located towards the top end 34 of the housing 24. The second and fourth catches 80, 84 are located towards the bottom end 36 of the housing 24 and may directly abut the rounded bottom section 48. A final sliding hook receptacle 86 may be formed in the top end of the device, as shown substantially in the middle of the housing 24.

Moving to FIGS. 4-7, the compressible seal 26 will now be described. As shown, the compressible seal 26 is substantially rectangular in shape, with a first left side 88 and a second right side 90 running substantially parallel to one another, and a top end 92 and a bottom end 94 running substantially parallel to one another. As best seen in FIG. 6, the top end 92 has rounded corners 96, 98 that are compatible with the shape of the lip 62 of the housing 24, and the bottom end 94 terminates in a straight edge 100 that can abut the straight edge 50 of the rounded bottom section 48.

Additionally, the compressible seal 26 also has an outer sidewall 102 and an inner sidewall 104, where the sidewalls 102, 104 are spaced from. For instance, the distance between the outer sidewall 102 and the inner sidewall 104 at the both sides 88, 90 may be between 2.5 and 4 millimeters, and more typically approximately 3.28 millimeters. Additionally, the distance between the outer sidewall 102 and inner sidewall 104 at the top end 92 may be between 4 and 7 millimeters, and more typically approximately 5.425 millimeters. Further still, the distance between the inner sidewall 104 and the straight edge 100 of the compressible seal may be between 6 and 10 millimeters, and more typically 8.33 millimeters. The inner sidewall 104 extends around the left and right sides 88, 90 and the top and bottom ends 92, 94 of the compressible seal 26, whereas the outer sidewall 102 extends around both of the sides 88, 90 and one of the ends 92. Preferably, the outer sidewall 102 and the inner sidewall 104 are sufficiently spaced such that the lip 62 fits between these sidewalls 102, 104 along the length of both of the sides 88, 90 and one of the ends 92 of the compressible seal 26. When installed on the housing 24, the lip 62 is located between the inner sidewall 104 and the outer sidewall 102 of the compressible seal 26, and front edges 106 of the inner sidewall 104 and outer sidewall 102 rest on the rear wall 42 of the housing 24. Additionally, at the bottom end 94 of the compressible seal 26, the straight edge 100 directly abuts the straight edge 50 of the rounded bottom section 48.

The compressible seal 26 may also have an opening 108 circumscribed by the inner sidewall 104. As shown, the opening 108 in the compressible seal 26 is substantially the same size as the opening 54 in the housing 24. As a result, the inner sidewall 104 of the compressible seal 26 may align with the inner sidewall 40 of the housing 24. The opening 108 of the compressible seal 26 therefore provides added clearance for components located within the opening 54 of the housing 24 to extend rearwardly beyond the rear of the compressible seal 26. By having this design, components such as the battery 58 that may be inserted into the housing 24 through the compressible seal 26 can be removed and replaced as needed.

Turning to FIGS. 5 and 7, the compressible seal 26 may also have a rear surface 110 extending along a rear plane 112 and a front plane 114 that extends along front edges 106 of the inner sidewall 104 and the outer sidewall 102. The rear surface 110 may be between 0.5-3 millimeters in thickness, and more typically approximately 1 millimeter. Depending on the hardness of the compressible seal 26, the thickness could be further varied. The compressible seal 26 may be compressed by 0.1-0.8 millimeters, and more typically between 0.3-0.5 millimeters while maintaining operation and safety of the compressible seal 26. For instance, in the disclosed embodiment the compressible seal 26 compresses approximately 0.26 millimeters when the cover 28 snaps into place on the housing 24.

Still referring to FIGS. 5 and 7, the rear surface 110 of the compressible seal 26 is angularly inclined at a rather shallow acute angle relative to the front plane 114, such that the thickness of the compressible seal 26 at the top end 92 is thinner than the thickness of the compressible seal 26 at the bottom end 94. The angle between the rear plane 112 extending through the rear surface 110 and the front plane 114 extending through the front edges 106 of the inner and outer sidewalls 104, 102 is between 2 and 7 degrees, and more typically approximately 5 degrees. By having a small amount of slope, desired criteria are achieved for the compression ratio and the reactive force of the catches 78, 80, 82, 84. Stated differently, the smaller the angle, the smaller the force on the catches 78, 80, 82, 84. Of course, other slopes may be used, although increased sliding distance, which would require an increase in the overall size of the footprint of the device 20 or increased reactive forces may result. Because of the geometry of the compressible seal 26, and more specifically the rear surface 110 extending angularly from the front plane 114, a planar sealing surface between the housing 24 and the cover 28 may be achieved when the cover 28 is installed, as will further be described below.

The compressible seal 26 may also include a number of features extending therefrom to help ensure the compressible seal 26 is appropriately and securely located relative to the housing 24. For instance, the illustrated embodiment includes four tabs, with one tab 116, 118 extending from the outer sidewall 102 at both sides 88, 90 and two laterally-spaced tabs 120, 122 extending upwardly from the outer sidewall 102 at the top end 92. Each tab includes a body 124 and a cylindrical lug 126 extending inwardly from an inner surface of the body 124 beyond the inner surface of the sides 88, 90 of the compressible seal 26. These lugs 126 are configured to align with the sockets 64, 66, 68, 70 formed in the rear wall 42 of the housing 24. Thus, once the compressible seal 26 is installed onto the housing 24, these lugs 126 extend past the rear wall 42 and press into the sockets 64, 66, 68, 70 in the housing 24 in an interference fit.

Also, fingers may extend from the outer sidewall 102 of the compressible seal 26, with grooves being formed adjacent to the fingers. As shown, the compressible seal 26 includes four sets of fingers and four sets of grooves. More specifically, first and second fingers 128, 130 extend from the first side 88 of the compressible seal 26 and third and fourth fingers 132, 134 extend from the second side 90 of the compressible seal 26. Similarly, four grooves may be formed in the compressible seal 26, with first and second grooves 136, 138 being formed directly adjacent to the first and second fingers 128, 130 in the first side 88 and third and fourth grooves 140, 142 being formed directly adjacent to the third and fourth fingers 132, 134 in the second side 90. The grooves 136, 138, 140, 142 are dimensioned such that the catches 78, 80, 82, 84 may be seated within the grooves. For instance, the illustrated grooves 136, 138, 140, 142 are substantially rectangular in shape, and are similar in size to the cross-sectional dimensions of the catches 78, 80, 82, 84. Additionally, as illustrated the fingers 128, 130, 132, 134 are substantially triangular in shape, where a substantially horizontal side 144 of the respective finger directly abutting the side of the respective catch. As such, the fingers 128, 130, 132, 134 are located such that they will directly abut against the catches 78, 80, 82, 84 of the housing 24, and the grooves 136, 138, 140, 142 are located such that the catches 78, 80, 82, 84 are retained in the grooves 136, 138, 140, 142. Further still, the compressible seal 26 may have an end extension piece 146 that may directly abut the sliding hook receptacle 86 formed in the top end 34 of the housing 24. The fingers 128, 130, 132, 134 and extension piece 146 rest on the rear wall 42 but engage the catches 78, 80, 82, 84 and sliding hook receptacle 86.

Of course, additional tabs, fingers, and grooves and the like may also be included to further ensure sufficient location of the compressible seal 26 relative to the housing 24. In addition to ensuring that the compressible seal 26 correctly aligns with the housing 24, the tabs 116, 118, 120, 122, fingers 128, 130, 132, 134, and grooves 136, 138, 140, 142 also serve to create a friction fitting of the compressible seal 26 relative to the housing 24. This in turn helps to reduce the displacement of the compressible seal 26 during installation of the cover 28.

Next, the cover 28 will be described. Looking to FIG. 1, the illustrated cover 28 includes a generally flat rear surface 148, first and second side sections 150, 152 extending downwardly about a radius, and a top end 154 that also extends downwardly about a radius between the first and second side sections 150, 152. As shown, the cover 28 has a continuous curved surface about the first side section 150, the top end 154, and the second side section 152, with a front edge 156 extending around the side sections 150, 152 and top end 154. The cover 28 terminates at a straight edge 158 located at a bottom end 160 opposite the top end 154 of the cover 28. The cover 28 may also have a grip 162 that extends rearwardly from the rear surface 148. The illustrated grip 162 includes three ribs that provide a user with an interface to disengage the cover 28 from the housing 24.

Figure 3:
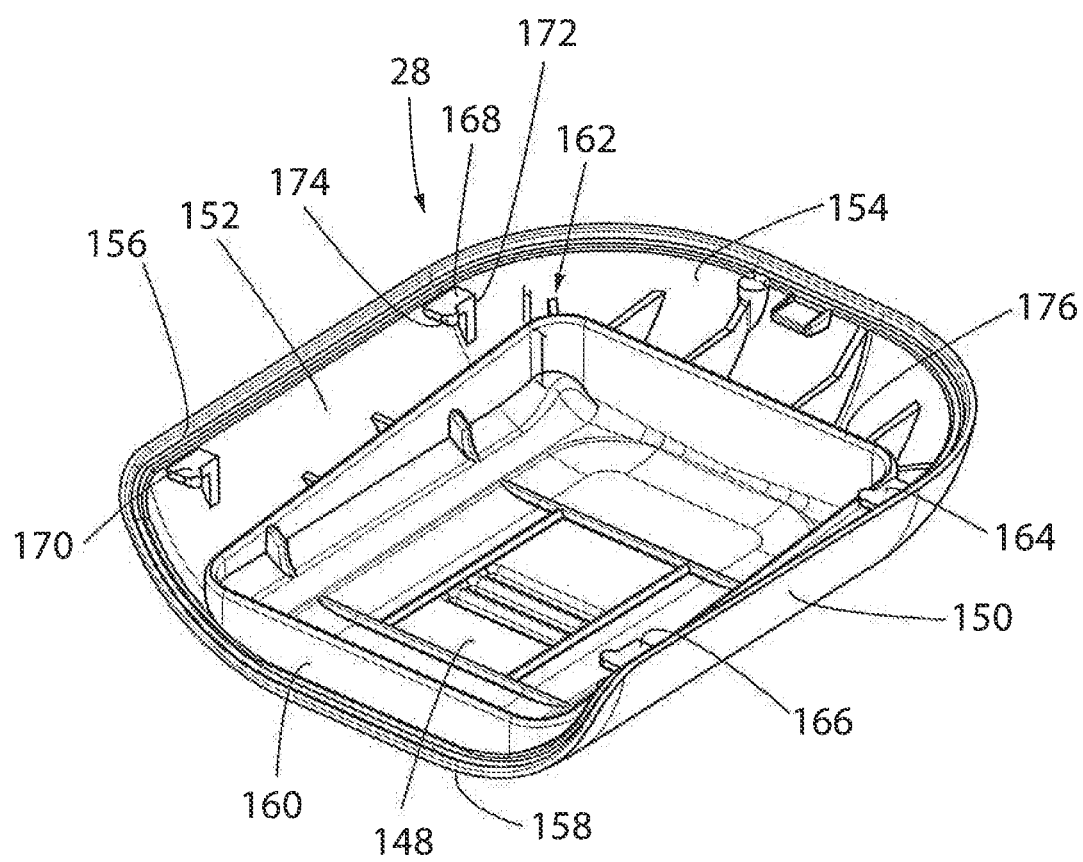
FIG. 3 is a perspective view of the cover of FIG. 1.
Figure 4:
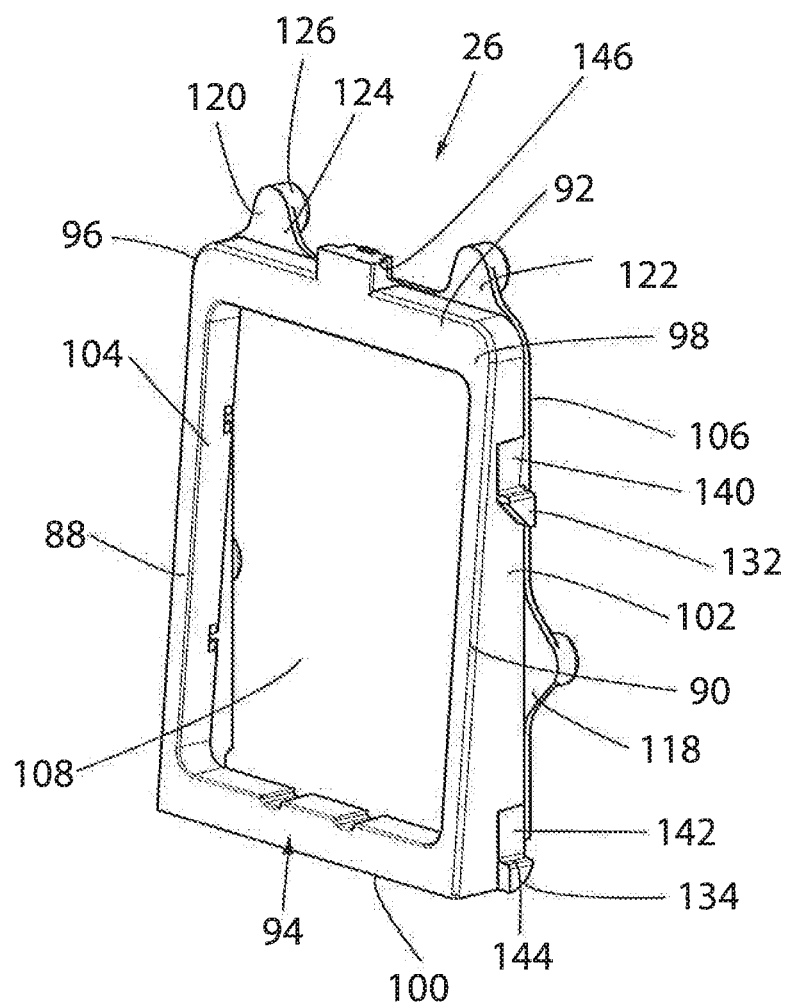
FIG. 4 is a perspective view of the seal of FIG. 1.

Turning to FIG. 3, an interior surface 163 of the cover 28 is illustrated. The interior surface 163 may include a plurality of fasteners that are compatible with the fasteners, such as catches, from the housing 24. More specifically, the cover 28 includes a number of hooks extending inwardly from the front edge 156 towards the interior of the cover 28. As shown, there are two hooks 164, 166 extending inwardly from the first side section 150 and two hooks 168, 170 extending inwardly from the second side section 152. The first and third hooks 164, 168 located on opposing side sections 150, 152 are mirror images of one another, as are the second and fourth hooks 166, 170. Each respective hook has a body 172 extending therefrom with a pointed end 174 that extends transversely from the body 172 and that functions to engage the respective catch. An additional end hook 176 extends toward the interior of the cover 28 from the top end. 154. This end hook 176 is substantially rectangular in shape and may be inserted into the sliding hook receptacle 86 when the cover 28 is installed onto the housing 24.

Furthermore, a generally rectangular rib 178 extends forwardly or inwardly from the interior surface 163 of the cover 28. The rib 178 is substantially the same shape as the shape of the perimeter of the compressible seal 26. In turn, this means that the shape of the rib 178 is substantially the same as the lip 62 of the housing 24. The width of the rib 178 may be between 0.5 and 2 millimeters, and more typically approximately 1.177 millimeters. Additionally, the maximum height of the rib 178 may be between 3.5 and 7.5 millimeters, and more typically approximately 5.268 millimeters. The specific sizing of the rib 178 relative to the compressible seal 26 and lip 62 causes the compressible seal 26 to be compressed between the rib 178 and the lip 62 around the entire perimeter of the opening 54 of the housing 24 when the cover 28 is installed. This ensures that an environmental seal is formed around the two sides 88, 90 and two ends 92, 94 of the compressible seal 26. This environmental seal isolates the interior of the housing 24 from the exterior. In doing so, moisture can be prevented from entering the opening 54. As shown, the rib 178 is preferably between 0.5-2 millimeters in width, and more preferably approximately 1 millimeter in width. The depth is a determining factor in the compression of the seal. The depth should be greater than the compression distance. Too large of a depth could result in the formation of a flexible part, reducing sealing consistency between production lots.

Of course, the specific dimensions and width of the rib 178 may vary depending on the shape of the compressible seal 26, the shape of the lip 62, and the shape of the opening 54 in the housing 24.

Figure 8:
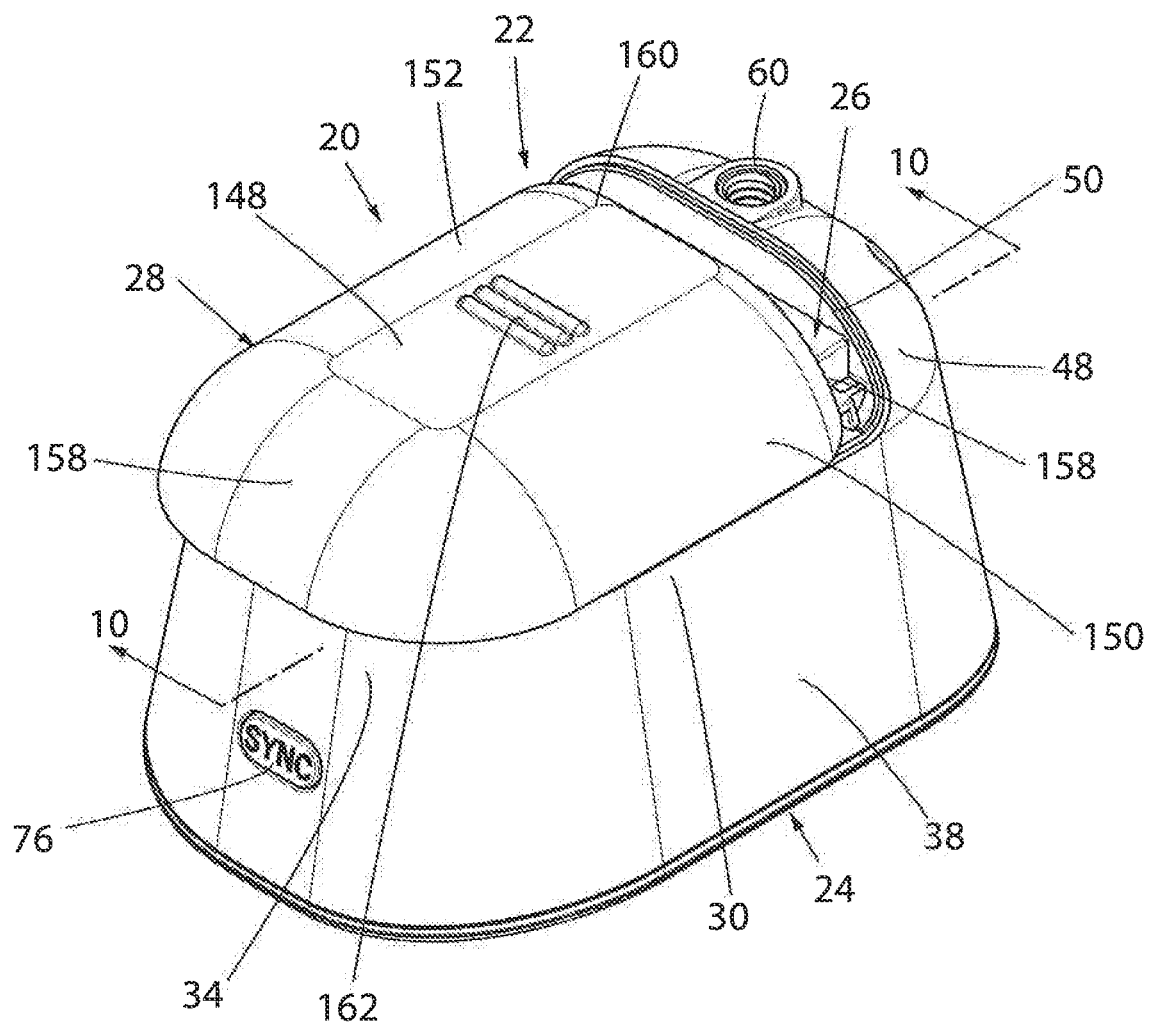
FIG. 8 is a perspective view of the cover being installed onto the housing.
Figure 9:
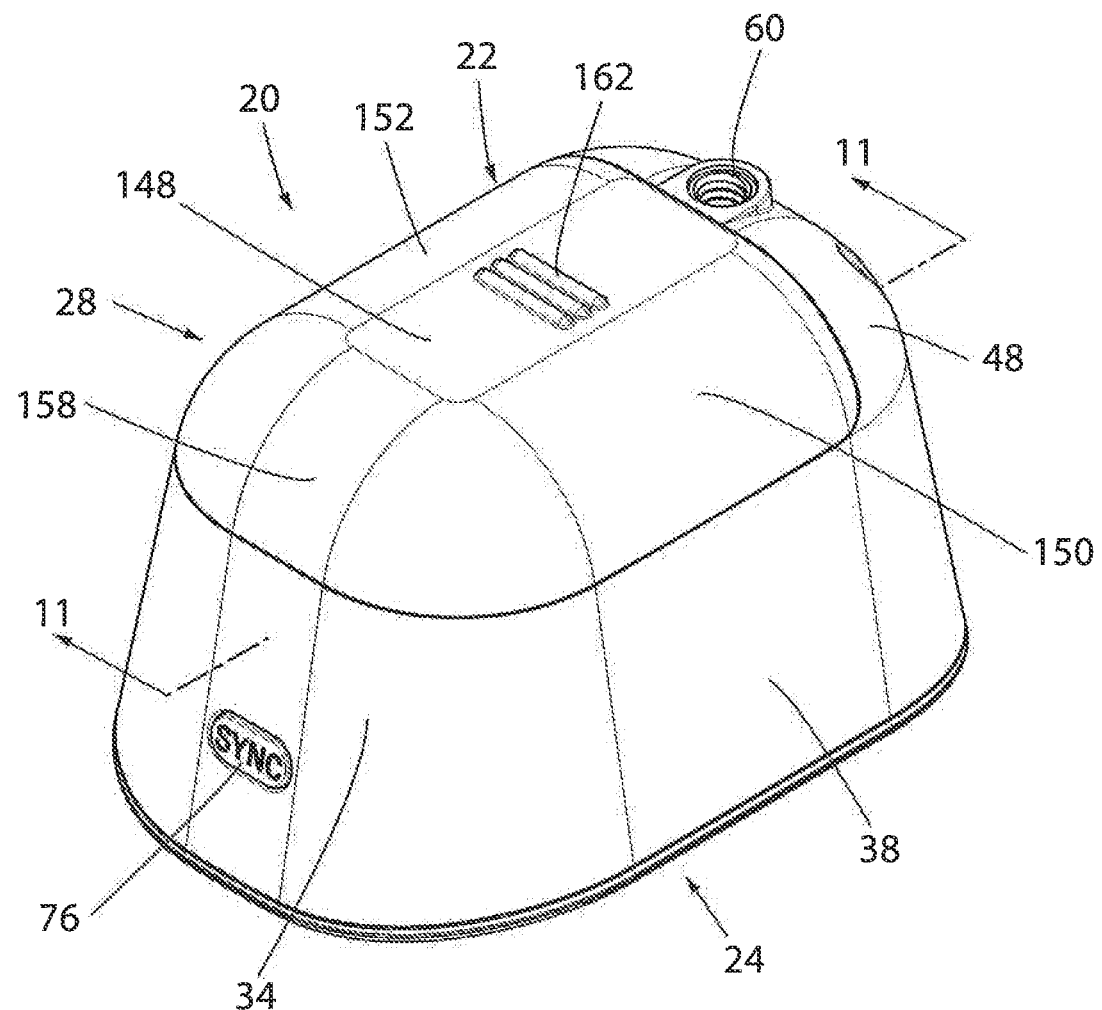
FIG. 9 is a perspective view of the cover once it is installed onto the housing.
Figure 10:
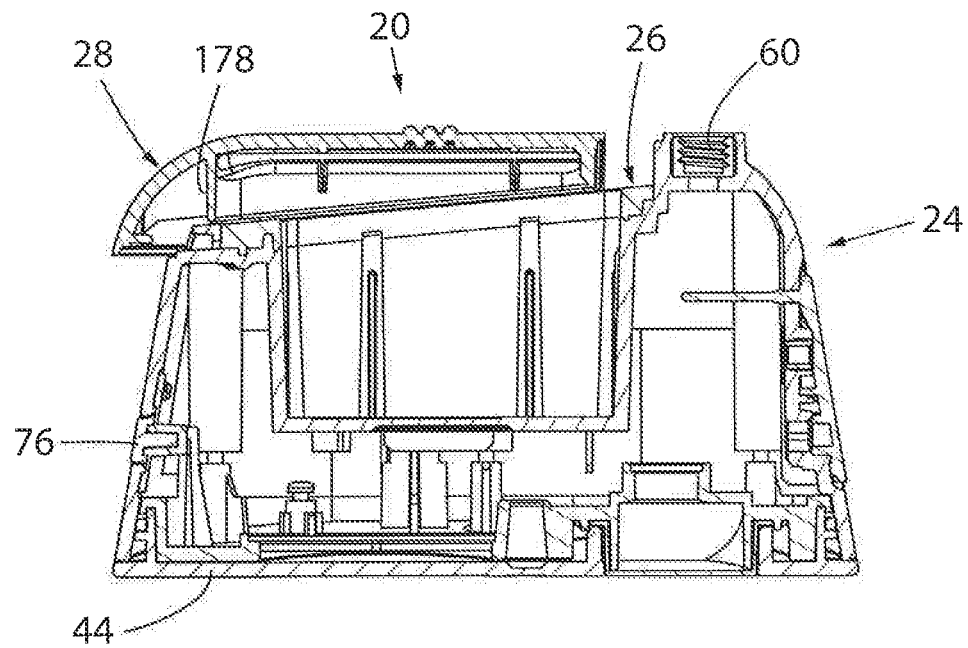
FIG. 10 is a cross-sectional side elevation view of the cover being installed on the housing about line 10-10 of FIG. 8.

Installation of the cover 28 onto the housing 24 will now be described. Once the compressible seal 26 is seated onto the housing 24 such that the lugs 126 are pressed into the sockets 64, 66, 68, 70, the cover 28 is orientated relative the rear wall 42 of the housing 24, as seen in FIG. 8. FIG. 10 also shows the initial location of the cover 28 relative to the housing 24 in a cross-sectional view. When this occurs, the front edge 156 of the cover 28 aligns with the channel 52 formed in the housing 24. As shown, the cover 28 is initially in a location approximately 3 millimeters from the fully closed position. While other sliding distances could be used, it should be understood that the greater the sliding distance, the greater the dimensions of the overall housing 24 would need to be. The cover 28 is then slid longitudinally downwardly and forwardly towards the bottom end 36 of the housing 24, as shown in FIG. 9. Due to the inclined slope of the rear surface 110 of the compressible seal 26, the compressible seal 26 is only compressed at the very end of the travel path of the cover 28. This makes it much easier for a user to install the cover 28 to the housing 24, while still ensuring that a sufficient environmental seal is achieved to prevent the introduction of moisture into the interior of the housing 24. Similarly, the compression force only occurs during a very short travel path. For instance, while the total distance of travel of the cover 28 from FIG. 8 to FIG. 9 is approximately 3 millimeters, the environmental seal is only formed during the final travel distance of 2 millimeters. This shortened travel path is beneficial because the amount of frictional forces that are encountered during the installation of the cover 28 is minimized in light of the slope of the compressible seal 26. Furthermore, by reducing the travel path of the cover 28, a user can install the cover 28 more easily to the housing 24. Once the cover 28 reaches the distance of 2 millimeters from the closed position, engagement of the hooks 164, 166, 168, 170 with the catches 78, 80, 82, 84 commences, and the hooks 164, 166, 168, 170 help the cover 28 to travel the final distance to the closed position while forcing the compressible seal 26 to compress. During this final travel distance, the inclined rear surface 110 is further compressed by the rib 178 of the cover 28, further enhancing the strength of the environmental seal.

Due to the geometry of the compression seal 26, a planar environmental seal can be formed between the cover 28 and the housing 24 despite the fact that the sealing area between the cover 28 and the housing 24 is a non-planar sealing area. More specifically, the non-planar sealing area located between the housing 24 and the cover 28 is achieved by the planar environmental seal along the rear surface 110 of the compressible seal 26.

Figure 11:
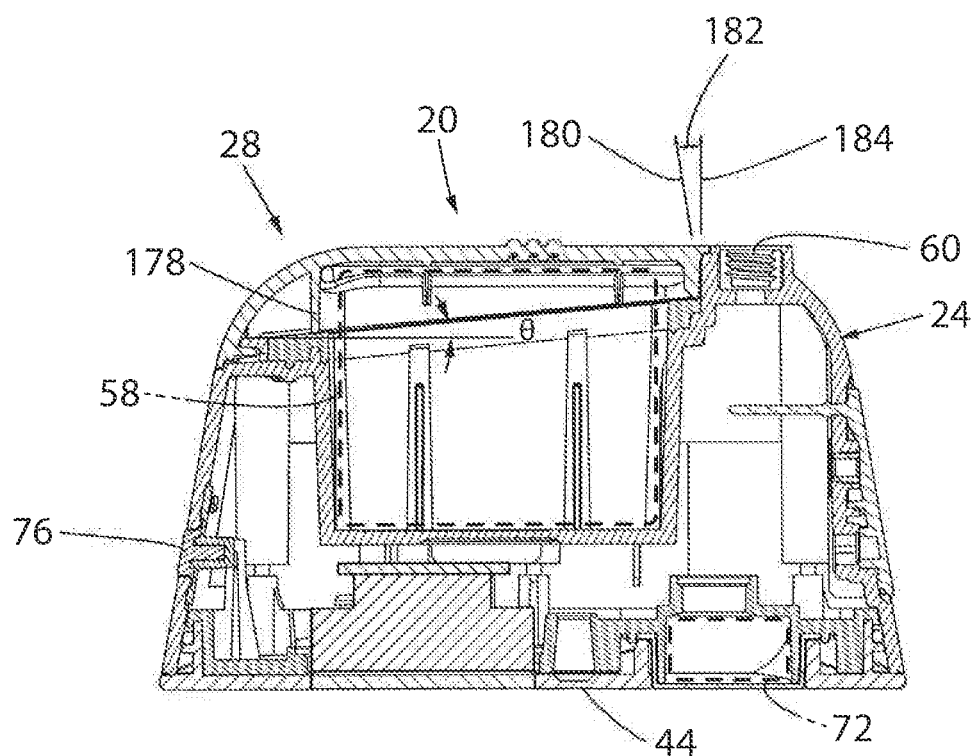
FIG. 11 is a cross-sectional side elevation view of the cover being installed on the housing about line 11-11 of FIG. 9.

In addition to the formation of a planar environmental seal, the geometry of the compressible seal 26 also features advantages in the resulting forces associated with securing the cover 28 to the housing 24. FIG. 11 includes a force diagram, which shows the force of the environmental seal as designated by reference number 180, the force of the snap as designated by reference number 182, and the force of the hook seal as designated by reference number 184. Due to the angle of the rear surface 110 relative to the front plane 114, and in turn the housing 24 itself, the amount of force required to form the seal-snap is minimized, while the force of the environmental seal and the force of the seal hook is maximized. Additionally, the frictional forces on the compressible seal 26 help to lock the cover 28 in place without acting against the clip force. This means that the cover 28 can easily be installed or uninstalled due to the minimal seal snap force, while still achieving the desired high-power seal. Based on a five-degree slope, it is estimated that the force acting on the vertical hooks would be about 11 times greater than the forces acting on the horizontal snaps.

It is contemplated that an alternative embodiment may incorporate any of the features of the previous embodiment described above.

For example, though the cover 28 is described as being provided on the rear wall 42 of the housing 24 and as sliding longitudinally downwardly of the housing when it is installed, the cover and the associated opening could be provided in any wall of the housing, such as one of the side walls or the bottom wall, and could slide into place from another direction.

Many other changes and modifications could be made to the invention without departing from the spirit thereof.

What is claimed is:

1. A weather-sealed consumer electronics device containing electrical equipment comprising:
    a housing having a rear wall defining a first plane;
    a seal mounted to the housing, the seal having a front edge extending along the first plane and a rear surface opposite the front edge that extends along a second plane that is acute to the first plane; and
    a cover releasably movable relative to the housing between a first, opened position and a second, closed position;
    wherein the cover and the seal are configured such that the cover contacts the rear surface of the seal and compresses the rear surface of the seal along a planar surface when the cover is moved to the closed position; and
    wherein, in the closed position of the cover, the seal defines a sealing area that extends from the front edge in the first plane to the rear surface of the seal that is compressed along the planar surface that is non-parallel to the front edge.

2. The weather-sealed consumer electronics device of claim 1,
    wherein the rear surface of the seal that is compressed along the planar surface in the closed position of the cover is parallel to the second plane.

3. The weather-sealed consumer electronics device of claim 1, wherein, in the open position of the cover, the rear surface extends at an angle between 2-7 degrees relative to the first plane.

4. The weather-sealed consumer electronics device of claim 3, wherein the angle between the first plane and the rear surface is approximately 5 degrees.

5. The weather-sealed consumer electronics device of claim 1, wherein the housing comprises:
    an opening formed therein; and
    a mounting lip formed around the perimeter of the opening;
    wherein the seal is seated against the mounting lip.

6. The weather-sealed consumer electronics device of claim 5, wherein the cover further comprises a rib extending inwardly from an interior surface of the cover, the rib having an inner surface that is of at least generally the same size and shape as an outer surface of the mounting lip; and
    wherein the rib compresses the seal against the mounting lip when the cover is moved to the closed position.

7. The weather-sealed consumer electronics device of claim 1, further comprising at least one fastener configured to releasably hold the cover in the closed position.

8. The weather-sealed consumer electronics device of claim 7, wherein the at least one fastener comprises:
    a catch; and
    a hook configured to releasably engage the catch to releasably hold the cover in place in the second closed position.

9. The weather-sealed consumer electronics device of claim 1, wherein the weather-sealed consumer electronics device comprises a battery-operated camera having electronics, a battery, and a lens.

10. A camera comprising:
    a housing with an opening formed in a rear wall thereof, the opening lying in a first plane of the rear wall and defining a battery compartment within the housing, the opening being bordered by a lip extending rearwardly of the first plane;
    an electronics lens mounted in the housing;
    a seal mounted on the housing in an overlying relationship with the lip, the seal having a front edge extending along the first plane and a rear surface opposite the front edge and extending along a second plane that is acute to the first plane;
    a cover releasably movable relative to the housing between a first, opened position and a second, closed position; and
    a sealing area that extends from the front edge of the seal to the rear surface of the seal and that is compressed along a planar surface when the cover is in the second, closed position; and
    wherein the rear surface of the seal that is compressed along the planar surface is non-parallel to the front edge when the cover is in the closed position thereof.

11. The camera of claim 10, wherein the cover travels a distance of between 2 millimeters and 4 millimeters from the opened position to the closed position.

12. The camera of claim 10, wherein the seal is made of a silicon having a shore A durometer value of 30-60.

13. The camera of claim 10,
    wherein the cover further comprises a rib extending inwardly from an inner surface thereof; and wherein the rib is dimensioned to compress the rear surface of the seal towards the lip when the cover is moved to the second, closed position.

14. The camera of claim 10, wherein the housing includes at least one socket formed adjacent to the opening;

wherein the seal has at least one tab extending therefrom that bears a lug;

wherein the seal is seated against the lip; and wherein the lug fits within the socket to form an interference fit.

15. A method of installing a cover onto a housing of a consumer electronics device comprising the steps of:

locating a front edge of a compressible seal adjacent to an opening in a wall of the housing defining a first plane, orienting the cover in a first, opened position directly adjacent the wall of the housing, wherein a rear surface of the compressible seal, opposite the front edge, extends along a second plane that is acute to the first plane when the cover is in the opened position there;

sliding the cover relative to the housing and the compressible seal to a second, closed position of the cover;

during the sliding, compressing the rear surface of the compressible seal along a planar surface between the housing and the cover;

forming an environmental seal between the housing and the cover in the closed position of the cover with the rear surface of the compressible seal compressed along the planar surface that is non-parallel to the front edge; and releasably locking the cover relative to the housing in the closed position of the cover.

16. The method of claim 15, wherein the locating step comprises aligning a lug associated with the compressible seal with a socket located in the housing; and inserting the lug into the socket.

17. The method of claim 15, wherein the locating step comprises aligning a finger extending from the compressible seal to abut against a catch extending from the housing; and inserting the catch into a groove formed into the compressible seal;

wherein the groove is located directly adjacent to the at least one finger.

18. The method of claim 15, further comprising the step of engaging at least one hook with at least one catch to secure the cover in the closed configuration.

19. The method of claim 15, further comprising the steps of:

aligning an opening in the seal with the opening in the housing; and removably inserting electronic equipment into the opening in the seal and the opening in the housing.

* * * * *